US012292611B2

(12) United States Patent
Xu et al.

(10) Patent No.: US 12,292,611 B2
(45) Date of Patent: May 6, 2025

(54) SUBMARINE OPTICAL CABLE SYSTEM

(71) Applicant: HMN Technologies Co., Limited, Tianjin (CN)

(72) Inventors: Changwu Xu, Tianjin (CN); Liping Ma, Tianjin (CN); Yan Wang, Tianjin (CN)

(73) Assignee: HMN Technologies Co., Limited, Tianjin (CN)

(*) Notice: Subject to any disclaimer, the term of this patent is extended or adjusted under 35 U.S.C. 154(b) by 163 days.

(21) Appl. No.: 17/841,149

(22) Filed: Jun. 15, 2022

(65) Prior Publication Data

US 2022/0308301 A1 Sep. 29, 2022

Related U.S. Application Data

(63) Continuation of application No. PCT/CN2019/127132, filed on Dec. 20, 2019.

(51) Int. Cl.
G02B 6/44 (2006.01)
H04Q 11/00 (2006.01)

(52) U.S. Cl.
CPC ......... *G02B 6/4427* (2013.01); *G02B 6/4452* (2013.01); *H04Q 11/0005* (2013.01); *H04Q 11/0062* (2013.01); *H04Q 2011/0052* (2013.01)

(58) Field of Classification Search
CPC .................. G02B 6/44; H04Q 11/00
(Continued)

(56) References Cited

U.S. PATENT DOCUMENTS 5,054,876 A * 10/1991 Grasso ............... H04B 10/0777
385/27
5,615,290 A 3/1997 Harasawa et al.
(Continued)

FOREIGN PATENT DOCUMENTS

CN 1372398 A 10/2002
CN 2641926 Y 9/2004
(Continued)

OTHER PUBLICATIONS

Tsuritani et al., Transoceanic Field Trial of Dynamic Optical Path Recovery using GMPLS-Controlled Optical Cross Connect, 2009 Conference on Optical Fiber Communication, IEEE, Mar. 22, 2009, p. 1-3.
(Continued)

*Primary Examiner* — Kaveh C Kianni
(74) *Attorney, Agent, or Firm* — Bret E. Field; Bozicevic, Field & Francis LLP

(57) ABSTRACT

Embodiments of the present application provide a submarine optical cable system for reducing the complexity of the submarine optical cable system. The submarine optical cable system comprises a first trunk station, a second trunk station, a branch station, first XC equipment, second OXC equipment, a trunk fiber set and a branch fiber. The trunk fiber set at least comprises a first trunk fiber and a second trunk fiber. The branch station is connected with the second trunk fiber arranged between the first OXC equipment and the second OXC equipment through the branch fiber. The first trunk station is configured for sending a first service through a first transmission channel in a first transmission channel set and sending a second service through a second transmission channel in a second transmission channel set. The first OXC equipment is configured for transferring the first transmission channel to the second trunk fiber. The branch station is configured for uploading or downloading the first service
(Continued)

and the second service through the second trunk fiber. The second OXC equipment is configured for transferring the transferred first transmission channel to the first trunk fiber.

10 Claims, 6 Drawing Sheets

(58) Field of Classification Search
    USPC ........................................................ 385/101
    See application file for complete search history.

(56) References Cited

U.S. PATENT DOCUMENTS

| | | | | |
|---|---|---|---|---|
| 6,163,084 | A * | 12/2000 | Yamaguchi | H04B 3/02 |
| | | | | 307/38 |
| 9,755,734 | B1 * | 9/2017 | Vusirikala | H04B 10/07955 |
| 10,374,725 | B2 * | 8/2019 | Bolshtyansky | H04B 10/808 |
| 2002/0057477 | A1 * | 5/2002 | Rocca | H04J 14/0279 |
| | | | | 398/104 |
| 2002/0126952 | A1 * | 9/2002 | Shirai | H04B 10/2972 |
| | | | | 385/24 |
| 2002/0167694 | A1 | 11/2002 | Feinberg et al. | |
| 2002/0176130 | A1 * | 11/2002 | Maeno | H04J 14/0249 |
| | | | | 398/20 |
| 2004/0105136 | A1 * | 6/2004 | Feinberg | H04J 14/0227 |
| | | | | 359/20 |
| 2006/0133822 | A1 * | 6/2006 | Manna | H04B 10/2935 |
| | | | | 398/173 |
| 2007/0154219 | A1 * | 7/2007 | Feinberg | H04J 14/0227 |
| | | | | 398/104 |
| 2011/0188803 | A1 * | 8/2011 | Kordahi | G02B 6/4415 |
| | | | | 385/101 |
| 2012/0155857 | A1 * | 6/2012 | Wang | H04B 10/0771 |
| | | | | 398/16 |
| 2015/0295674 | A1 * | 10/2015 | Inoue | H04J 14/0215 |
| | | | | 398/83 |
| 2018/0278341 | A1 * | 9/2018 | Desbruslais | H04B 10/032 |
| 2020/0028590 | A1 * | 1/2020 | Lim | H04Q 11/0005 |
| 2021/0302660 | A1 * | 9/2021 | Garrett | G02B 6/354 |

FOREIGN PATENT DOCUMENTS

| | | |
|---|---|---|
| CN | 1812304 A | 8/2006 |
| CN | 104429001 A | 3/2015 |
| CN | 108781114 A | 11/2018 |
| JP | 2016066935 A | 4/2016 |
| JP | WO2019082557 A1 | 5/2019 |

OTHER PUBLICATIONS

First Office Action for corresponding Chinese Patent Application No. 201980102158.0, mailed May 7, 2023, 6 pages.

Lee et al., Routing and Switching in a Wavelength Convertible Optical Network, IEEE Infocom '93 The Conference on Computer Communications, Proceedings, IEEE Xplore, Aug. 6, 2002, p. 578-585.

* cited by examiner

SUBMARINE OPTICAL CABLE SYSTEM

FIELD OF THE PRESENT DISCLOSURE

The present application relates to the field of submarine optical cable communication, and particularly relates to a submarine optical cable system.

BACKGROUND OF THE PRESENT DISCLOSURE

Fibers in a submarine optical cable exist in pairs. For a land end station of each submarine optical cable communication system, one fiber in paired fibers is configured for sending an optical signal to a land end station of an opposite end, and the other fiber in the paired fibers is configured for receiving the optical signal sent by the land end station of the opposite end.

In a submarine optical cable system, a trunk of the submarine optical cable is generally connected with a plurality of branch stations and is configured for realizing uploading or downloading of services. Usually, each member in a submarine optical cable alliance purchases an independent fiber pair, a bandwidth can only be allocated in the own purchased fiber pair for a service of each member. For a branch station which is busy with services, lots of members need to transmit the services with the station, and the station needs to respectively configure branch fibers connected with the station for the fiber pair of each member. However, each fiber pair being configured with the branch fibers will result in higher complexity of the submarine optical cable system.

SUMMARY OF THE PRESENT DISCLOSURE

Embodiments of the present application provide a submarine optical cable system, aiming to reduce the complexity of the submarine optical cable system.

In a first aspect, an embodiment of the present application provides a submarine optical cable system, comprising: a first trunk station, a second trunk station, a branch station, first optical cross-connect (OXC) equipment, second OXC equipment, a branching unit (BU), a trunk fiber set and a branch fiber, wherein one end of the first OXC equipment is connected with terminal equipment of the first trunk station by the trunk fiber set, the other end of the first OXC equipment is connected with one end of the second OXC equipment by the trunk fiber set, and the other end of the second OXC equipment is connected with terminal equipment of the second trunk station by the trunk fiber set; the BU is arranged on the trunk fiber set between the first OXC equipment and the second OXC equipment, and terminal equipment of the branch station is connected with the BU by the branch fiber; and the trunk fiber set at least comprises a first trunk fiber and a second trunk fiber, and the first trunk fiber and the second trunk fiber are paths used for transmitting optical signals;

the first trunk station is configured for sending a first optical signal through the first trunk fiber, and the first trunk station is configured for sending a second optical signal through the second trunk fiber; the first optical signal and the second optical signal are service signals or dummy lights, wherein the service signals are signals that carry services, and the dummy lights are signals that do not carry services;

the first OXC equipment is configured for crossing the first optical signal and the second optical signal, so as to obtain a crossed first optical signal and a crossed second optical signal;

the branch station is configured for uploading or downloading the crossed second optical signal through the second trunk fiber;

the second OXC equipment is configured for crossing the crossed first optical signal and the crossed second optical signal, so as to restore the crossed first optical signal to the first optical signal and restore the crossed second optical signal to the second optical signal;

the second trunk station is configured for receiving the first optical signal through the first trunk fiber and receiving the second optical signal through the second trunk fiber.

In one implementable manner, the first OXC equipment is configured for crossing the first optical signal and the second optical signal, so as to obtain the crossed first optical signal and the crossed second optical signal, wherein each of a spectral bandwidth of the first optical signal and a spectral bandwidth of the second optical signal comprises at least one wavelength value;

the first OXC equipment is configured for crossing the wavelength value of the first optical signal and the wavelength value of the second optical signal, and the wavelength ranges of the wavelength values for crossing are same.

In one implementable manner, the first OXC equipment is configured for crossing the first optical signal and the second optical signal, so as to obtain the crossed first optical signal and the crossed second optical signal, wherein each of a spectral bandwidth of the first optical signal and a spectral bandwidth of the second optical signal at least comprises one spectral sub-band, and each spectral sub-band comprises at least one or more wavelength values; and the first OXC equipment is configured for crossing the spectral sub-band of the first optical signal and the spectral sub-band of the second optical signal, and the wavelength ranges of the spectral sub-bands for crossing are same.

In one implementable manner, the first OXC equipment is configured for crossing the first optical signal and the second optical signal, so as to obtain the crossed first optical signal and the crossed second optical signal, wherein:

the first trunk fiber and the second trunk fiber are two cores in a multi-core fiber (MCF), and the first optical signal and the second optical signal are signals transmitted in the cores; and the first OXC equipment and the second OXC equipment are also used for crossing the optical signals between the cores.

In one implementable manner, the terminal equipment of the first trunk station at least comprises a first terminal and a second terminal; the terminal equipment of the second trunk station at least comprises a third terminal and a fourth terminal; and the terminal equipment of the branch station at least comprises a fifth terminal;

the first terminal is configured for sending the first optical signal through the first trunk fiber;

the second terminal is configured for sending the second optical signal through the second trunk fiber;

the fifth terminal is configured for uploading or downloading the crossed second optical signal through the second trunk fiber;

the third terminal is configured for receiving the first optical signal through the first trunk fiber;

the fourth terminal is configured for receiving the second optical signal through second trunk fiber.

In one implementable manner, the trunk fiber set also comprises a third trunk fiber, and the third trunk fiber is a path for transmitting an optical signal;
the first trunk station is also configured for sending a third optical signal through the third trunk fiber, and the third optical signal is a service signal or a dummy light;
the first OXC equipment is also configured for crossing the first optical signal, the second optical signal and the third optical signal, so as to obtain a crossed first optical signal, a crossed second optical signal and a crossed third optical signal;
the second OXC equipment is configured for crossing the crossed first optical signal, the crossed second optical signal and the crossed third optical signal, so as to restore the crossed first optical signal to the first optical signal, restore the crossed second optical signal to the second optical signal and restore the crossed third optical signal to the third optical signal;
the second trunk station is configured for receiving the third optical signal through the third trunk fiber.

In one implementable manner, the first trunk fiber is one path of fiber in a first trunk fiber pair, and the second trunk fiber is one path of fiber in a second trunk fiber pair.

In one implementable manner, the BU comprises an optical switch; the optical switch is arranged on the second trunk fiber between the first OXC equipment and the second OXC equipment; and the branch fiber is connected with the second trunk fiber between the first OXC equipment and the second OXC equipment by the optical switch;
the optical switch is configured for switching the second optical signal or the crossed second optical signal to the branch fiber for transmission.

In one implementable manner, the submarine optical cable system also comprises reconfigurable optical add-drop multiplexer (ROADM) equipment, one end of the ROADM equipment is connected with the BU through the branch fiber, and the other end of the ROADM equipment is connected with the terminal equipment of the branch station through the branch fiber;
the ROADM equipment is configured for downloading the second optical signal or the crossed second optical signal to the branch station through the branch fiber;
or,
the ROADM equipment is configured for uploading the optical signal from the branch station through the branch fiber.

In one implementable manner, the submarine optical cable system also comprises at least one repeater, the repeater is arranged on the trunk fiber set between the first OXC equipment and the second OXC equipment, or the repeater is arranged on the branch fiber;
the repeater is configured for amplifying the optical signal sent by the first trunk station;
or,
the repeater is configured for amplifying the optical signal sent by the branch station.

In one implementable manner, the types of the branch fiber and the trunk fibers in the trunk fiber set comprise a single mode fiber (SMF), a multi-mode fiber (MMF) or a multi-core fiber (MCF).

In a second aspect, an embodiment of the present application provides a submarine optical cable system, comprising: a first trunk station, a second trunk station, a branch station, a trunk fiber set, a branch fiber, a BU and first OXC equipment arranged in the BU, wherein terminal equipment of the first trunk station is connected with terminal equipment of the second trunk station through the trunk fiber set; the trunk fiber set at least comprises a first trunk fiber, and the first trunk fiber is a path used for transmitting an optical signal; and the BU is arranged on the trunk fiber set;
a first input end of the first OXC equipment is connected with the terminal equipment of the first trunk station through the BU, and a second input end of the first OXC equipment is connected with terminal equipment of the branch station through the branch fiber;
a first output end of the first OXC equipment is connected with the terminal equipment of the second trunk station through the BU, and a second output end of the first OXC equipment is connected with the terminal equipment of the branch station through the branch fiber;
the first trunk station is configured for sending a first optical signal through the first trunk fiber, and the branch station is configured for uploading a fourth optical signal through the branch fiber; and the first optical signal and the fourth optical signal are service signals or dummy lights, the service signals are signals that carry services, and the dummy lights are signals that do not carry services;
the first OXC equipment is configured for crossing the first optical signal and the fourth optical signal, so as to obtain a crossed first optical signal and a crossed fourth optical signal;
the branch station is configured for downloading the crossed fourth optical signal through the branch fiber;
the second trunk station is configured for receiving the crossed first optical signal through the first trunk fiber.

In one implementable manner, the BU comprises an optical switch, the optical switch is arranged on the first trunk fiber, and the first OXC equipment is connected with the first trunk fiber by the optical switch;
the optical switch is configured for switching the first optical signal to the first OXC equipment for transmission.

DESCRIPTION OF THE EMBODIMENTS

Embodiments of the present application provide a submarine optical cable system. A branch station can realize uploading or downloading of any service transmitted in a trunk fiber set only by connecting one path of trunk fiber in the trunk fiber set; and the branch station does not need to be configured with a plurality of branch fibers, so that the complexity of the submarine optical cable system is reduced. The description and the claims of the present application as well as the terms 'first', 'second', 'third', 'fourth' and so on (if the terms exist) in the above drawings are used for distinguishing similar objects, and are not necessarily used for describing a specific sequence or an order of priority. It should be understood that data used in the manner can be exchanged under a proper situation, so that the embodiments described here can be implemented in sequences except the contents illustrated or described here. Additionally, the terms 'comprise' and 'have' and any deformation thereof are intended to cover exclusive comprising; and for example, a process, a method, a system, a product or equipment comprising a series of steps or units are not necessarily limited to those steps or units listed clearly, but can comprise other steps or units that are not listed clearly or are inherent for the process, the method, the product or the equipment.

Figure 1:
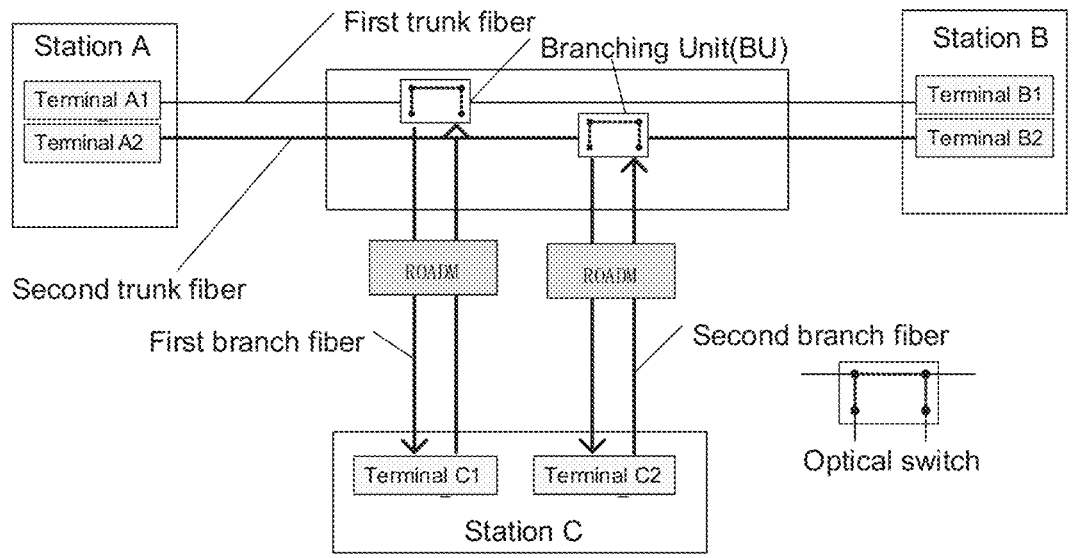
FIG. 1 is a schematic diagram of an existing submarine optical cable system.

FIG. 1 is a schematic diagram of an existing submarine optical cable system. A station A and a station B are trunk stations, and a station C is a branch station. The station A and the station B are connected with each other by trunk fibers, and the station C is connected with the trunk fibers by branch fibers. Specifically, multiple paths of fibers can be connected between the station A and the station B, and each station can be provided with a plurality of terminals; and all paths of fibers are mutually independent, and bandwidths are not shared. Usually, each path of fiber is only used for transmitting a service of a certain client. For example, a first service is transmitted between a terminal A1 and a terminal B1 through a first trunk fiber, and a second service is transmitted between a terminal A2 and a terminal B2 through a second trunk fiber. For the station C, both the first service and the second service also possibly need to be transmitted to the station C. A terminal C1 needs to be connected to the first trunk fiber through a first branch fiber, a terminal C2 needs to be connected to the second trunk fiber through a second branch fiber, and each branch fiber is also configured with ROADM equipment for downloading the service from the trunk fibers or uploading the service to the trunk fibers. Taking the first service as an example, an optical switch arranged on the first trunk fiber is configured for switching the first service originally transmitted in the first trunk fiber to the first branch fiber, and then, the first service can be downloaded to the terminal C1 by the ROADM equipment.

It should be noted that the existing submarine optical cable system comprises a BU, and the BU is configured for branching the fiber. The first trunk fiber and the second trunk fiber are respectively provided with the BU. The BU comprises the optical switch. The terminal C1 is connected to the first trunk fiber specifically by the first branch fiber and the optical switch in the BU, and the terminal C2 is connected to the second trunk fiber specifically by the second branch fiber and the optical switch in the BU.

It can be seen from the submarine optical cable system shown in FIG. 1 that, a plurality of branch fibers need to be configured for the station C and are respectively connected with the corresponding trunk fibers, so that the station C realizes uploading or downloading of multipath services. However, numerous trunk fibers possibly exist in actual application, and the complexity of the submarine optical cable system is high if each path of trunk fiber is configured with the branch fiber corresponding to the trunk fiber.

It should be noted that each terminal in the above can be terminal transmission equipment (TTE) specifically.

For the purpose, the present application provides a novel submarine optical cable system, so that the complexity of the submarine optical cable system can be effectively reduced.

Figure 2:
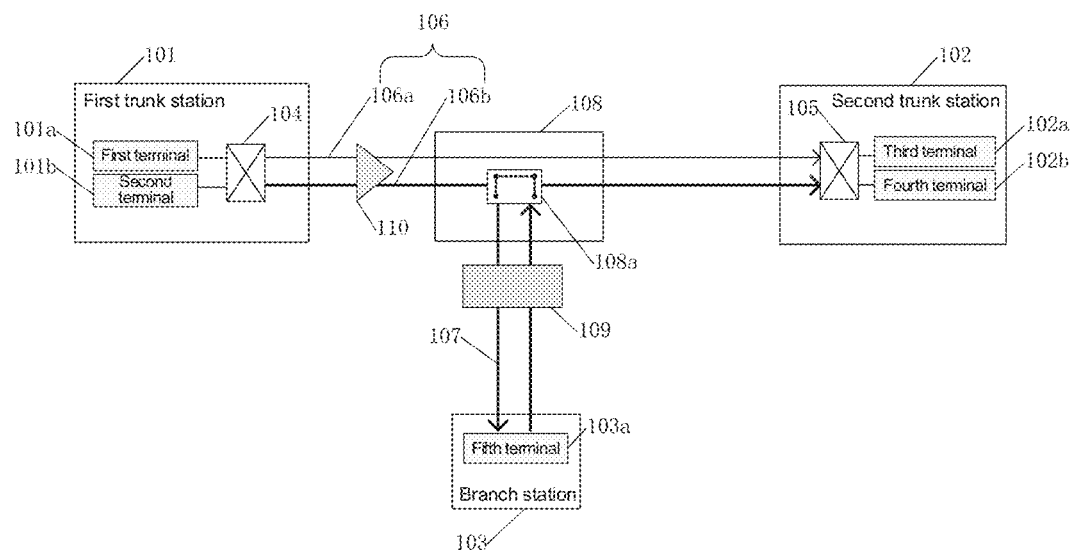
FIG. 2 is a schematic diagram of a submarine optical cable system according to the present application.

FIG. 2 is a schematic diagram of a submarine optical cable system according to the present application. The submarine optical cable system comprises a first trunk station 101, a second trunk station 102, a branch station 103, first OXC equipment 104, second OXC equipment 105, a trunk fiber set 106 and a branch fiber 107, wherein the first trunk station 101 is connected with one end of the first OXC equipment 104 through the trunk fiber set 106, the other end of the first OXC equipment 104 is connected with one end of the second OXC equipment 105 through the trunk fiber set 106, and the other end of the second OXC equipment 105 is connected with the second trunk station 102 through the trunk fiber set 106. The trunk fiber set 106 at least comprises a first trunk fiber 106*a* and a second trunk fiber 106*b*, and the branch station 103 is connected with the second trunk fiber 106*b* between the first OXC equipment 104 and the second OXC equipment 105 through the branch fiber 107.

It should also be noted that the submarine optical cable system of the present application is provided with a BU 108, and the BU 108 is arranged on the trunk fiber set 106 and is located between the first OXC equipment 104 and the second OXC equipment 105. One end of the first OXC equipment 104 is connected with the terminal equipment of the first trunk station 101 through the trunk fiber set 106, and the other end of the first OXC equipment 104 is connected with the BU 108 through the trunk fiber set 106. In the BU 108, an opposite end port of a port connected with the first OXC equipment 104 is connected with the terminal equipment of the second trunk station 102 through the trunk fiber set 106. The terminal equipment of the branch station 103 is also connected with the BU 108 through the branch fiber 107.

An optical switch is arranged in the BU 108, and the optical switch is specifically arranged on the fibers, so as to branch the fibers. The optical switch can be arranged on the first trunk fiber 106*a*, and can also be arranged on the second trunk fiber 106*b*.

If the terminal equipment of the branch station 103 needs to download an optical signal from the second trunk fiber 106*b*, the terminal equipment can be connected with an optical switch 108*a* arranged on the second trunk fiber 106*b* through the branch fiber 107, so that the optical signal of the second trunk fiber 106*b* can be transmitted to the branch fiber 107, and at the moment, the branch fiber 107 is connected with the second trunk fiber 106*b* through the optical switch 108*a*. Specifically, the optical switch 108*a* can be used for switching a first service and a second service into the branch fiber 107 for transmission. In this case, the connection state of the first trunk fiber 106*a*, the second trunk fiber 106*b* and the BU 108 is that: the first trunk fiber 106*a* penetrates through the interior of the BU 108, but is not connected with the optical switch 108*a*, and the second trunk fiber 106*b* is connected with the optical switch 108*a* in the BU 108. A situation that the terminal equipment of the branch station 103 needs to download an optical signal from the first trunk fiber 106*a* can refer to the above contents, which is not repeated here.

Each path of trunk fiber has a transmission channel set which corresponds to the path of trunk fiber and is configured for transmitting a service. Namely, the first trunk fiber 106a corresponds to a first transmission channel set, the second trunk fiber 106b corresponds to a second transmission channel set, and the service transmitted by each transmission channel only corresponds to the transmission channel. The transmission channels can be spectral sub-bands obtained by dividing spectral bandwidths of the fibers, each spectral sub-band comprises one or more wavelengths, and each transmission channel can comprise one or more spectral sub-bands. If each trunk fiber is a multi-core fiber, the transmission channels can also be cores in the multi-core fiber. Different types of transmission channels are respectively further described hereinafter.

The first OXC equipment 104 is arranged in the first trunk station 101, and the second OXC equipment 105 is arranged in the second trunk station 102. Additionally, the first trunk station 101 and the second trunk station 102 can also be provided with a plurality of terminals, and different terminals are used for sending different services. For example, the first trunk station 101 at least comprises a first terminal 101a and a second terminal 101b, and the second trunk station 102 at least comprises a third terminal 102a and a fourth terminal 102b. Additionally, the branch station 103 at least comprises a fifth terminal 103a. The service is transmitted between the first terminal 101a and the third terminal 102a through the first trunk fiber 106a, and the service is transmitted between the second terminal 101b and the fourth terminal 102b through the second trunk fiber 106b. It should be noted that each terminal in the above can be terminal transmission equipment (TTE) specifically.

Specifically, the first terminal 101a is configured for sending the first service through a first transmission channel (106a channel 1) in the first trunk fiber 106a. The second terminal 101b is configured for sending the second service through a second transmission channel (106b channel 2) in the second trunk fiber 106b.

The first OXC equipment 104 is configured for exchanging the first transmission channel (106a channel 1) in the first trunk fiber 106a and a first transmission channel (106b channel 1) with the corresponding bandwidth in the second trunk fiber 106b, so that the first transmission channel (106a channel 1) enters the second trunk fiber 106b, and the first transmission channel (106b channel 1) enters the first trunk fiber 106a.

In other words, after being processed by the first OXC equipment 104, the first service originally transmitted in the first trunk fiber 106a is transferred into the second trunk fiber 106b for transmission. Therefore, the services transmitted in the second trunk fiber simultaneously comprise the above first service and the above second service.

As the branch fiber 107 is connected with the second trunk fiber 106b, the fifth terminal 103a can be used for uploading or downloading the first service and the second service through the second trunk fiber 106b.

The second OXC equipment 105 is configured for transferring the first transmission channel (106a channel 1) transferred to the second trunk fiber 106b back to the first trunk fiber 106a, and transferring the second transmission channel (106b channel 1) transferred to the first trunk fiber 106a back to the second trunk fiber 106b.

It can be understood that the third terminal 102a is opposite end equipment of the first terminal 101a, and the fourth terminal 102b is opposite end equipment of the second terminal 101b. For example, the first terminal 101a and the third terminal 102a are equipment of a company A, and the second terminal 101b and the fourth terminal 102b are equipment of a company B; and an interoperable reference point interface (IPI) of the company A can only be used for identifying the first service, and an IPI of the company B can only be used for identifying the second service. Therefore, before the first service is transmitted to the second trunk station 102, the second OXC equipment 105 needs to be used for transferring the first transmission channel back to the first trunk fiber 106a.

The third terminal 102a is configured for receiving the first service through the first transmission channel, and the fourth terminal 102b is configured for receiving the second service through the second transmission channel. It can be understood that in actual application, the third terminal 102a and the fourth terminal 102b can also be regarded as sending ends of the services, and the first terminal 101a and the second terminal 101b are regarded as receiving ends of the services, which are not limited specifically here.

Figure 3:
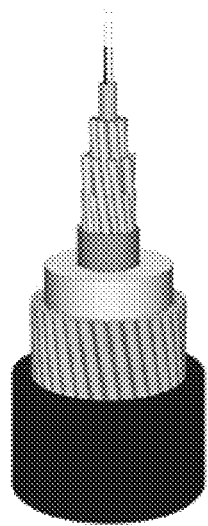
FIG. 3 is a schematic diagram of a submarine optical cable.

It should be noted that fibers in a submarine optical cable exist in pairs. FIG. 3 is a schematic diagram of the submarine optical cable. A fiber pair refers to two paths of fibers connected with a receiving port and a sending port of the terminal transmission equipment, and the two paths of fibers form one path of communication link for receiving and one path of communication link for sending. Different fiber pairs keep isolated from each other. Namely, no physical connection exists between the different fiber pairs. The branch fiber 107 is also a fiber pair, wherein one path of fiber is configured for uploading the service, and the other path of fiber is configured for downloading the service.

Optionally, the submarine optical cable system can also comprise ROADM equipment 109. One end of the ROADM equipment 109 is connected with the fifth terminal 103a through the branch fiber 107, and the other end of the ROADM equipment 109 is connected with the optical switch 108a on the second trunk fiber 106b through the branch fiber 107. The ROADM equipment 109 can be used for downloading the service to the fifth terminal 103a from the second trunk fiber 106b through the branch fiber 107, and can also be used for uploading the service to the second trunk fiber 106b through the branch fiber 107. It should be noted that if the number of services transmitted in the second trunk fiber 106b is more than the number of services that the branch station 103 needs to download, the ROADM equipment 109 is configured to select the service that needs to be downloaded from the services transmitted in the second trunk fiber 106b according to actual requirements. If all the services transmitted in the second trunk fiber 106b need to be downloaded to the branch station 103, the ROADM equipment 109 can also be not configured. The ROADM equipment 109 can be used for selecting the service that need to be downloaded and flexibly processing bandwidth allocation for uploading and downloading of the service of a branch.

Optically, the submarine optical cable system can also comprise at least one repeater 110 which is configured for amplifying the optical signals in the fibers, wherein the repeater 110 can be arranged on the trunk fiber set 106 between the first OXC equipment 104 and the BU 108. Specifically, the services sent from the first trunk station 101 to the second trunk station 102 are transmitted in the trunk fiber set 106 in a form of optical signals. The repeater 110 can be used for amplifying the optical signals sent from the first trunk station 101 to the second trunk station 102. Alternatively, the repeater 110 can also be arranged on the trunk fiber set 106 between the second OXC equipment 105 and the BU 108 and is configured for amplifying the optical signals sent from the second trunk station 102 to the first trunk station 101. Alternatively, the repeater 110 can also be arranged on the branch fiber 107 between the branch station 103 and the ROADM equipment 109 and is configured for amplifying the optical signals sent from the branch station 103 to the first trunk station 101 or the second trunk station 102.

It should also be noted that the repeater 110 arranged on the trunk fiber set 106 between the first OXC equipment 104 and the BU 108 can not only be designed for amplifying the optical signals sent from the first trunk station 101 to the second trunk station 102, but also be designed for amplifying the optical signals sent from the second trunk station 102 to the first trunk station 101, or designed for simultaneously amplifying the optical signals in the two directions. The repeater 110 arranged on the trunk fiber set 106 between the second OXC equipment 105 and the BU 108 can not only be designed for amplifying the optical signals sent from the second trunk station 102 to the first trunk station 101, but also be designed for amplifying the optical signals sent from the first trunk station 101 to the second trunk station 102, or designed for simultaneously amplifying the optical signals in the two directions. For the repeater 110 arranged on the branch fiber 107 between the branch station 103 and the ROADM equipment 109, the above contents are only exemplary description for the location arrangement of the repeater 110, and the location arrangement thereof only needs to meet the condition that the repeater 110 is arranged between the branch station 103 and the BU 108. Additionally, the repeater 110 can not only be designed for amplifying the optical signals sent from the branch station 103 to the first trunk station 101 or the second trunk station 102, but also be designed for amplifying the optical signals sent from the first trunk station 101 or the second trunk station 102 to the branch station 103, or designed for simultaneously amplifying the optical signals in the two directions.

It should also be noted that when the above repeater 110 is designed, one repeater can be adopted for implementation, and a plurality of repeaters can also be adopted to form a repeater group for implementation. The repeater 110 can be a one-way repeater and can also be a two-way repeater, which is not limited specifically in the embodiment of the present application.

Optically, the types of the above trunk fibers and the above branch fiber can comprise a single mode fiber (SMF), a multi-mode fiber (MMF) or a multi-core fiber (MCF) etc., which are not limited specifically here.

In some possible application scenarios, the above trunk fiber set 106 can also comprise more trunk fibers. With reference to an implementation manner of the above embodiment, the branch station 103 can also be used for receiving services from other trunk fibers through the branch fiber 107.

Figure 4:
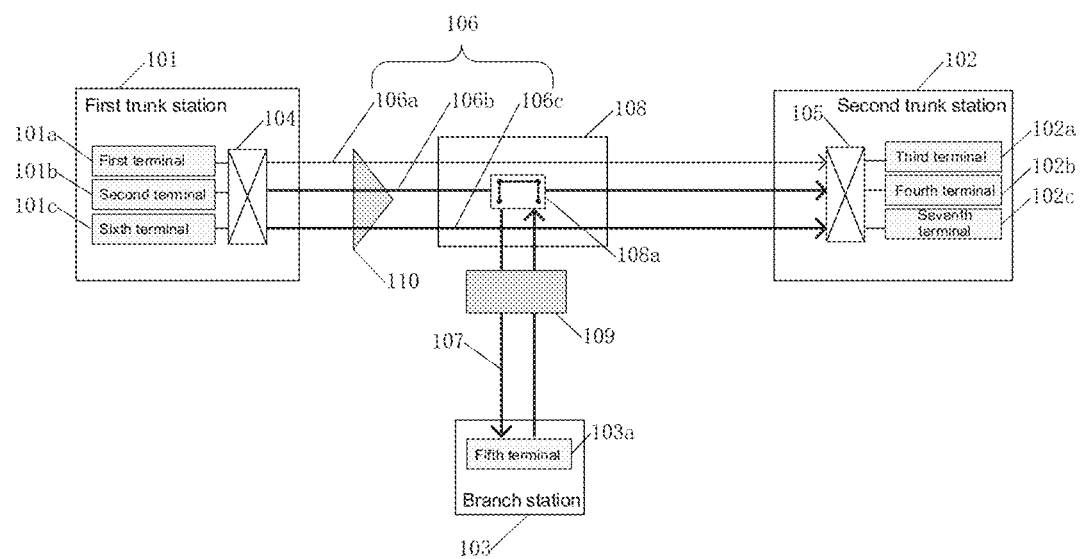
FIG. 4 is a schematic diagram of another submarine optical cable system according to the present application.

FIG. 4 is a schematic diagram of another submarine optical cable system according to the present application. For example, the trunk fiber set 106 can also comprise a third trunk fiber 106c, and the third trunk fiber 106c has a corresponding third transmission channel set. Compared with the submarine optical cable system shown in FIG. 2, a sixth terminal 101c in the first trunk station 101 can also be used for sending a third service through one transmission channel in the third transmission channel set. The first OXC equipment 104 can also be used for transferring the transmission channel used for transmitting the third service to the second trunk fiber 106b. In this case, the fifth terminal 103a can be used for uploading or downloading the third service through the second trunk fiber 106b. The second OXC equipment 105 can also be used for transferring the transmission channel back to the third trunk fiber 106c. A seventh terminal 102c in the second trunk station 102 can also be used for receiving the third service through the transmission channel. It can be understood that the number of trunk fibers in the trunk fiber set 106 is subject to actual application, which is not limited specifically here.

Figure 6:
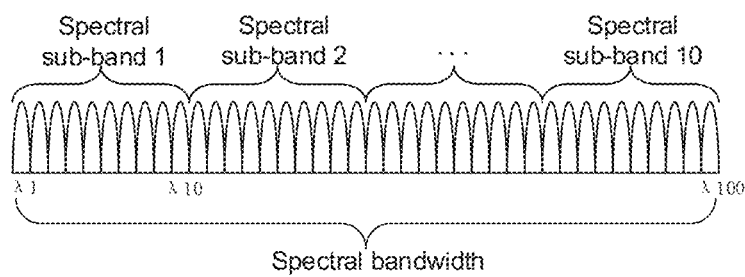
FIG. 6 is a schematic diagram of dividing a spectral bandwidth into spectral sub-bands.

It should be noted that the specific forms of the transmission channels corresponding to the trunk fibers in the above embodiment can be diversified, which are respectively introduced hereinafter:

In a first form, the transmission channel set corresponding to each trunk fiber is a spectral bandwidth of each trunk fiber, the spectral bandwidth of each trunk fiber can be divided into a plurality of spectral sub-bands, and different spectral sub-bands are used for transmitting different services. FIG. 6 is a schematic diagram of dividing the spectral bandwidth into the spectral sub-bands. For example, the spectral bandwidth comprises a wavelength $\lambda 1$ to a wavelength $\lambda 100$. The wavelength $\lambda 1$ to the wavelength $\lambda 10$ correspond to one spectral sub-band, the wavelength $\lambda 11$ to the wavelength $\lambda 20$ correspond to one spectral sub-band, and in the same manner, the spectral bandwidth is divided into 10 spectral sub-bands. Alternatively, each wavelength can correspond to one spectral sub-band; and for example, the spectral bandwidth comprises a wavelength $\lambda 1$ to a wavelength $\lambda 100$, so the spectral bandwidth is divided into 100 spectral sub-bands. Additionally, in actual application, the wavelength range of each spectral sub-band can be same (equal) and can also be different (non-equal), which is not limited specifically here.

Figure 5:
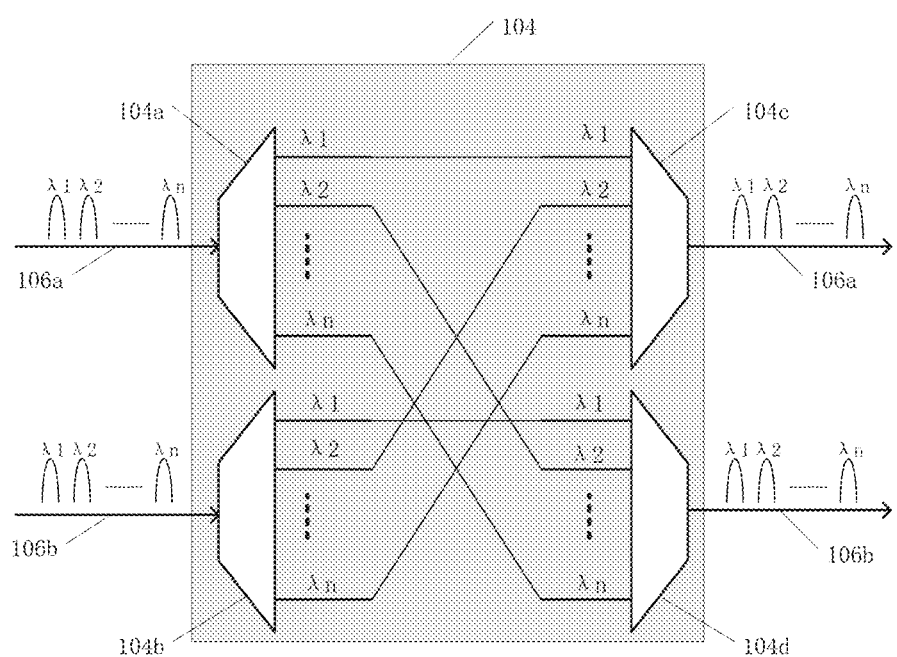
FIG. 5 is a schematic diagram of transferring spectral sub-bands by OXC equipment.

FIG. 5 is a schematic diagram of transferring the spectral sub-bands by the OXC equipment. A first spectral bandwidth of the first trunk fiber 106a comprises N spectral sub-bands from a wavelength $\lambda 1$ to a wavelength $\lambda n$, and a second spectral bandwidth of the second trunk fiber 106b also comprises N spectral sub-bands from a wavelength $\lambda 1$ to a wavelength $\lambda n$.

Specifically, the first service and the second service are transmitted in a form of optical signals, a demultiplexer 104a can be used for carrying out wavelength splitting on the optical signals transmitted in the first trunk fiber 106a, so as to obtain the spectral sub-bands $\lambda 1$ to $\lambda n$, wherein the first service occupies the spectral sub-band $\lambda 2$ in the first spectral bandwidth. Similarly, a demultiplexer 104b can be used for carrying out wavelength splitting on the optical signals transmitted in the second trunk fiber 106b, so as to obtain the spectral sub-bands $\lambda 1$ to $\lambda n$, wherein the second service occupies the spectral sub-band $\lambda 1$ in the second spectral bandwidth.

It should be noted that spectral sub-bands occupied by a service of each client can be appointed in advance in actual application. For example, whether the first spectral bandwidth of the first trunk fiber 106a or the second spectral bandwidth of the second trunk fiber 106b, the spectral sub-bands $\lambda 1$ are used for transmitting the second service, and the spectral sub-bands $\lambda 2$ are used for transmitting the first service. In this case, the bandwidth allocation for the service of each client is not limited to a certain fiber pair, and the spectral bandwidths of all the fiber pairs are divided into a plurality of spectral sub-bands, and the bandwidths are uniformly allocated for the service of each client.

The first OXC equipment 104 is configured for exchanging the spectral sub-band $\lambda 2$ in the first spectral bandwidth and the spectral sub-band $\lambda 2$ in the second spectral bandwidth. Then, a multiplexer 104c is configured for carrying out wavelength combination on the optical signals in all the exchanged spectral sub-bands and coupling the optical signals to the first trunk fiber 106a. Similarly, a multiplexer 104d is configured for carrying out wavelength combination on the optical signals in all the exchanged spectral sub-bands and coupling the optical signals to the second trunk fiber 106*b*. It can be seen that, after the first service originally transmitted in the first trunk fiber 106*a* is processed by the first OXC equipment 104, the first service is transferred into the second trunk fiber 106*b* for transmission. A processing manner of the second OXC equipment 105 is similar to a processing manner of the first OXC equipment 104. The second OXC equipment is configured for exchanging the spectral sub-band λ2 in the first spectral bandwidth and the spectral sub-band λ2 in the second spectral bandwidth again.

Optionally, the first spectral bandwidth of the first trunk fiber 106*a* and the second spectral bandwidth of the second trunk fiber 106*b* can comprise the same spectral sub-bands. For example, both the first spectral bandwidth and the second spectral bandwidth can comprise 100 spectral sub-bands λ1 to λ100. Alternatively, the first spectral bandwidth and the second spectral bandwidth comprise different spectral sub-bands. For example, the first spectral bandwidth comprises 20 spectral sub-bands λ1 to λ20, and the second spectral bandwidth comprises 30 spectral sub-bands λ21 to λ50.

It should be noted that, if the first spectral bandwidth and the second spectral bandwidth comprise the same spectral sub-bands, the first OXC equipment 104 can be used for exchanging the same spectral sub-bands in the first spectral bandwidth and the second spectral bandwidth according to a manner described above. If the first spectral bandwidth and the second spectral bandwidth comprise different spectral sub-bands, the first OXC equipment 104 is configured for transferring the spectral sub-bands used for transmitting the first service to the second spectral bandwidth. For example, the second spectral bandwidth originally comprises spectral sub-bands λ21 to λ50, and after the second spectral bandwidth is processed by the first OXC equipment 104, a spectral sub-band λ2 is added into the second spectral bandwidth.

Optionally, each spectral sub-band in the spectral bandwidths can comprise one wavelength value and can also comprise multiple wavelength values.

In a second form, each trunk fiber is a multi-core fiber, and each core corresponds to one transmission channel.

Figure 7:
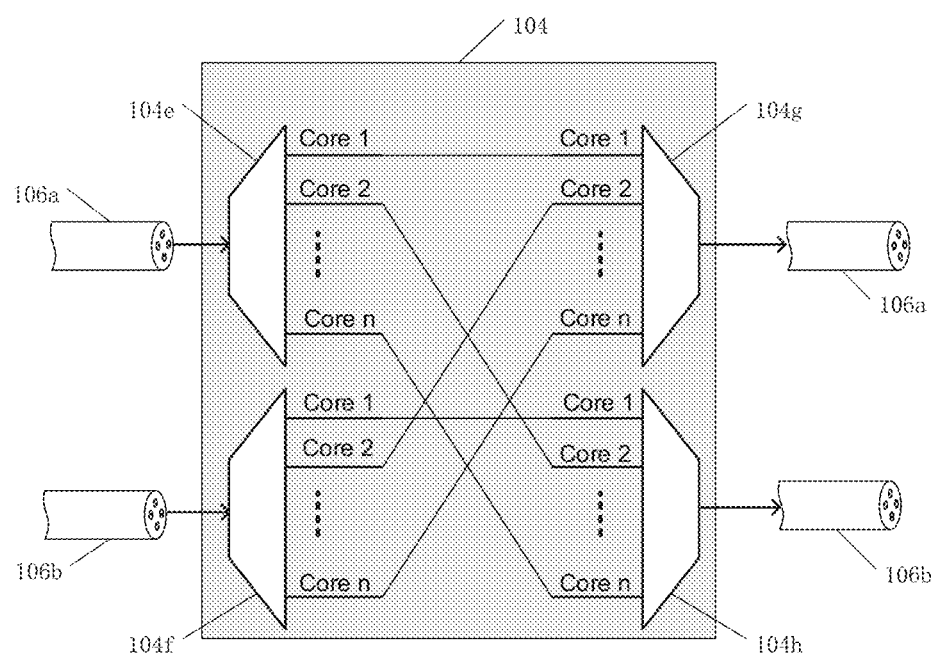
FIG. 7 is a schematic diagram of transferring cores by the OXC equipment.

FIG. 7 is a schematic diagram of transferring the cores by the OXC equipment. The first trunk fiber 106*a* comprises N cores 1 to n, and the second trunk fiber 106*b* comprises N cores 1 to n as well.

Specifically, a FAN-out module 104*e* is configured for separating the N cores in the first trunk fiber 106*a* from each other, and a FAN-out module 104*f* is configured for separating the N cores in the second trunk fiber 106*b* from each other, wherein the core 2 in the first trunk fiber 106*a* is configured for transmitting the first service, and the core 1 in the second trunk fiber 106*b* is configured for transmitting the second service.

The first OXC equipment 104 can be used for exchanging the core 2 in the first trunk fiber 106*a* and any core in the second trunk fiber 106*b* except the core 1. Then, a FAN-in module 104*g* is configured for combining the exchanged core into the first trunk fiber 106*a*. Similarly, a FAN-in module 104*h* is configured for combining the exchanged core into the second trunk fiber 106*b*. Through exchange of the cores, the first service originally transmitted in the first trunk fiber 106*a* is transferred into the second trunk fiber 106*b* for transmission. The processing manner of the second OXC equipment 105 is similar to the processing manner of the first OXC equipment 104, and the second OXC equipment is configured for exchanging the two cores exchanged before.

Optionally, the first OXC equipment 104 can also be used for adding the core 2 in the first trunk fiber 106*a* into the second trunk fiber 106*b*, and the core originally existing in the second trunk fiber 106*b* remains unchanged. Then, the second OXC equipment 105 is configured for transferring the core 2 added into the second trunk fiber 106*b* back into the first trunk fiber 106*a*.

Optionally, the number of cores in the first trunk fiber 106*a* and the second trunk fiber 106*b* can be same or different, which is not limited specifically here.

It should be noted that in actual application, any device that can be used for transferring or exchanging the transmission channels of the services belongs to the OXC equipment described in the present application.

In the submarine optical cable system according to the embodiment of the present application, the first OXC equipment can be used for transferring the first transmission channel in the first transmission channel set corresponding to the first trunk fiber to the second trunk fiber. In this way, although the branch station is not connected with the first trunk fiber through the branch fiber, the branch station can still be used for uploading or downloading the service originally transmitted in the first trunk fiber through the branch fiber connected with the second trunk fiber. In other words, based on the submarine optical cable system of the present application, the branch station can realize uploading or downloading of any service transmitted in the trunk fiber set only by connecting one path of trunk fiber in the trunk fiber set, and the branch station does not need to be configured with a plurality of branch fibers, so that the complexity of the submarine optical cable system is reduced.

Figure 8:
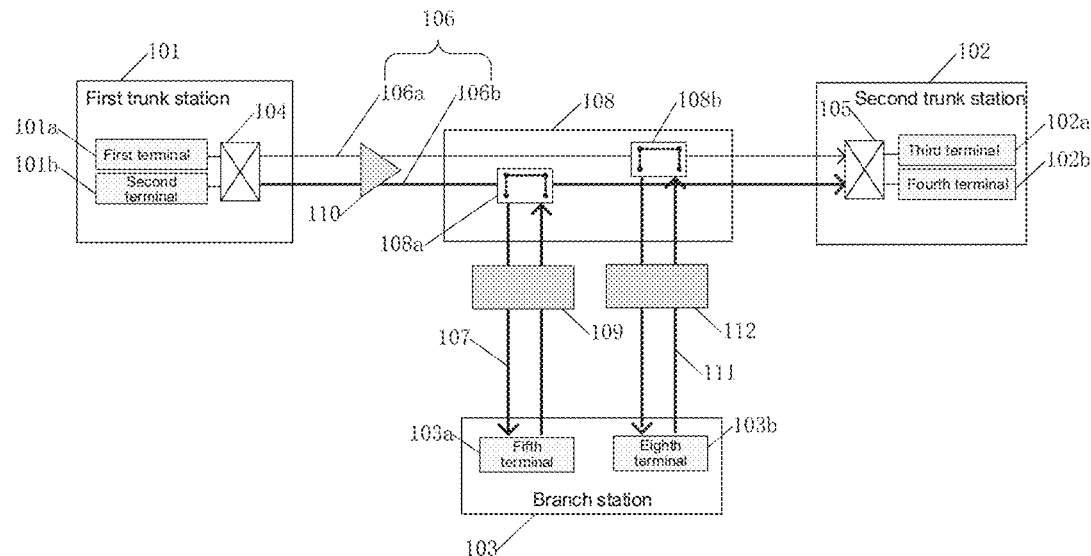
FIG. 8 is a schematic diagram of another submarine optical cable system according to the present application.

It should be noted that the present application can also be applied in a submarine optical cable system comprising a plurality of branch fibers. FIG. 8 is a schematic diagram of another submarine optical cable system provided by the present application. It can be seen that the difference between the submarine optical cable system in FIG. 8 and the submarine optical cable system shown in FIG. 2 lies in that: an eighth terminal 103*b* in the branch station 103 is connected with the first trunk fiber 106*a* through another branch fiber 111. Correspondingly, an optical switch 108*b* can also be configured in the BU 108, wherein the optical switch 108*b* is arranged on the first trunk fiber 106*a*. The branch fiber 111 can also be provided with ROADM equipment 112.

Under the situation that all equipment in the submarine optical cable system work normally, the first service sent by the first terminal 101*a* is transmitted in the first trunk fiber 106*a*, and the optical switch 108*b* can be used for switching the first service into the branch fiber 111 for transmission. The ROADM equipment 112 can be used for downloading the first service to the eighth terminal 103*b* through the branch fiber 111. However, when the first service is interrupted as the ROADM equipment 112 breaks down or the branch fiber 111 breaks down and so on, the first OXC equipment 104 can be used for transferring the first service originally transmitted in the first trunk fiber 106*a* into the second trunk fiber 106*b* for transmission, so as to ensure that the first service can be normally transmitted to the branch station 103.

It can be understood that any submarine optical cable system that can be used for transferring or exchanging the transmission channels used for transmitting the services by the OXC equipment falls within the protection scope of the present application.

Figure 9:
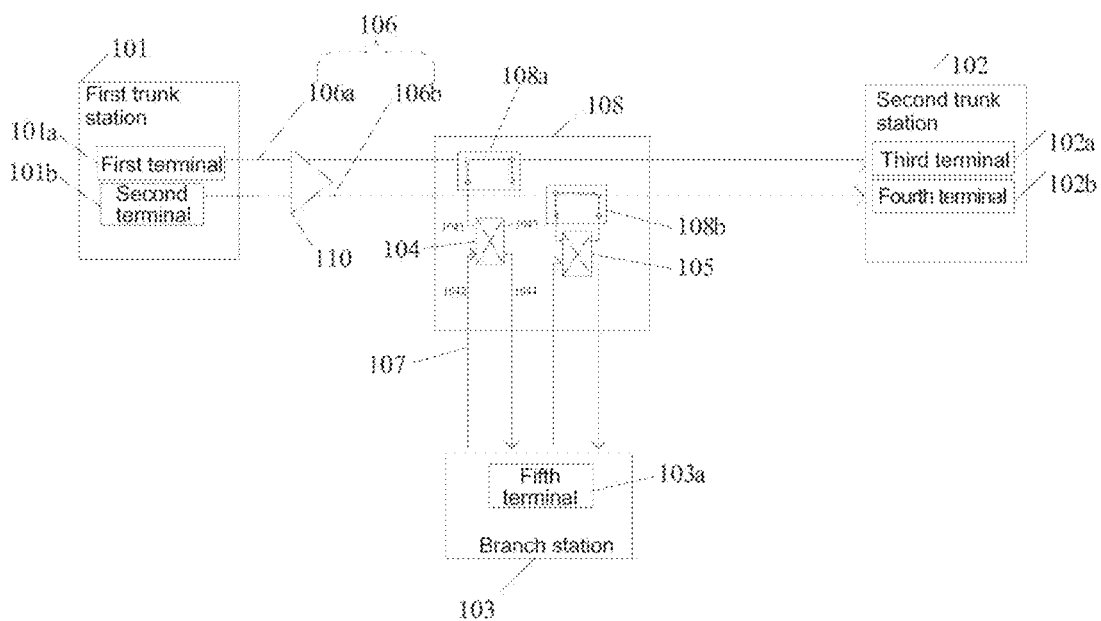
FIG. 9 is a schematic diagram of another submarine optical cable system according to the present application.

FIG. 9 is a schematic diagram of another submarine optical cable system according to the present application. The submarine optical cable system comprises a first trunk station 101, a second trunk station 102, a branch station 103, a trunk fiber set 106, a branch fiber 107, a BU 108 and first OXC equipment 104 arranged in the BU 108, wherein the terminal equipment of the first trunk station 101 is connected with the terminal equipment of the second trunk station 102 through the trunk fiber set 106; the trunk fiber set 106 at least comprises a first trunk fiber 106a, and the first trunk fiber 106a is a path used for transmitting optical signals. The BU 108 is arranged on the trunk fiber set 106. A first input end 1041 of the first OXC equipment 104 is connected with the terminal equipment of the first trunk station 101 through the BU 108, and a second input end 1042 of the first OXC equipment 104 is connected with the terminal equipment of the branch station 103 through the branch fiber 107. A first output end 1043 of the first OXC equipment 104 is connected with the terminal equipment of the second trunk station 102 through the BU 108, and a second output end 1044 of the first OXC equipment 104 is connected with the terminal equipment of the branch station 103 through the branch fiber 107.

The first trunk station 101 is configured for sending a first optical signal through the first trunk fiber 106a, and the branch station 103 is configured for uploading a fourth optical signal through the branch fiber 107. The first optical signal and the fourth optical signal are service signals or dummy lights, wherein the service signals are signals that carry services, and the dummy lights are signals that do not carry services. The first OXC equipment 104 is configured for crossing the first optical signal and the fourth optical signal, so as to obtain a crossed first optical signal and a crossed fourth optical signal. The branch station 103 is configured for downloading the crossed fourth optical signal through the branch fiber 107. The second trunk station 102 is configured for receiving the crossed first optical signal through the first trunk fiber 106a.

In the embodiment, the first trunk station 101 and the second trunk station 102 can also be provided with a plurality of terminals, and different terminals are used for sending different services. For example, the first trunk station 101 at least comprises a first terminal 101a, and the second trunk station 102 at least comprises a third terminal 102a. Additionally, the branch station 103 at least comprises a fifth terminal 103a. Signals are transmitted between the first terminal 101a and the third terminal 102a through the first trunk fiber 106a. It can be understood that the third terminal 102a is opposite end equipment of the first terminal 101a. Each terminal in the above can be terminal transmission equipment (TTE).

Figure 10:
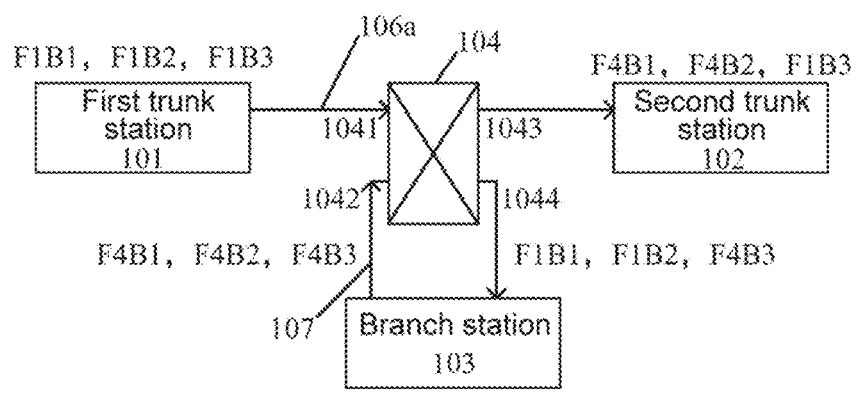
FIG. 10 is a schematic diagram of crossing signals of the submarine optical cable system described in FIG. 9.

FIG. 10 is a schematic diagram of crossing the signals of the submarine optical cable system described in FIG. 9. A crossing process of the signals of the submarine optical cable system is described in details hereinafter according to an example shown in FIG. 10.

As shown in FIG. 10, F1 represents the first optical signal. The spectral bandwidth of the first optical signal can be divided into a plurality of spectral sub-bands, and only three sub-bands are described in the embodiment, which does not constitute any limit to the number of the sub-bands. The three sub-bands of the first optical signal are respectively F1B1, F1B2 and F1B3. F4 represents the fourth optical signal. Correspondingly, the spectral bandwidth of the fourth optical signal can be divided into three sub-bands, which are respectively F4B1, F4B2 and F4B3, and the wavelength ranges of all the sub-bands are same.

The first optical signal is input to the first OXC equipment 104 through the first input end 1041, the fourth optical signal is input to the first OXC equipment 104 through the second input end 1042, and the first OXC equipment 104 can be used for crossing the first optical signal and the fourth optical signal. Specifically, the first OXC equipment is configured for crossing F1B1 and F4B1, crossing F1B2 and F4B2, and changing routes of F1B1, F1B2, F4B1 and F4B2. In this way, the crossed first optical signal comprises three sub-bands F4B1, F4B2 and F1B3, and the crossed fourth optical signal comprises three sub-bands F1B1, F1B2 and F4B3. The fifth terminal 103a of the branch station 103 can be used for downloading the crossed fourth optical signal through the branch fiber 107, and the third terminal 102a of the second trunk station 102 can be used for receiving the crossed first optical signal through the first trunk fiber 106a. At the moment, the sub-bands F1B1 and F1B2 in the first optical signal are services that need to be transmitted to the branch station 103, and the sub-band F1B3 is a service that needs to be transmitted to the second trunk station 102. The sub-bands F4B1 and F4B2 in the fourth optical signal are services that need to be transmitted to the second trunk station 102, and the sub-band F4B3 can be an idle sub-band.

It can be understood that in some implementation manners, the third terminal 102a can also be regarded as a sending end of the optical signals (services), and the first terminal 101a can also be regarded as a receiving end of the optical signals (services).

In this way, service transmission between the first trunk station 101 and the branch station 103, between the first trunk station 101 and the second trunk station 102 and between the branch station 103 and the second trunk station 102 is simultaneously completed through crossing of the first OXC equipment. The service transmission between the stations is more flexible, service downloading of the branch station 103 is also more flexible, and a ROADM does not need to be configured, so that the service transmission is reliable.

It should be noted that the above example only shows crossing between the spectral sub-bands of the first optical signal and the fourth optical signal. In some implementation manners, the spectral bandwidths of the first optical signal and the fourth optical signal can both comprise at least one wavelength value. The first OXC equipment 104 can be used for crossing the wavelength value of the first optical signal and the wavelength value of the fourth optical signal, and the wavelength ranges of the wavelength values used for being crossed are same. A specific crossing manner can refer to the above example, which is not repeated here. In some other implementation manners, the first trunk fiber 106a and the second trunk fiber 106b are two cores in the multi-core fiber. The first optical signal and the fourth optical signal are signals transmitted in the cores, and the first OXC equipment 104 can be used for crossing the optical signals between the cores. The specific crossing manner can refer to the above example, which is not repeated here.

Continuing to refer to FIG. 9, the submarine optical cable system according to the present application can also comprise a second terminal 101b, the second trunk fiber 106b, second OXC equipment 105 and a fourth terminal 102b. The second terminal 101b can be used for transmitting a second optical signal through the second trunk fiber 106b. The fifth terminal 103a can be used for uploading a fifth optical signal through the branch fiber 107. The second OXC equipment can be used for crossing the second optical signal and the fifth optical signal. The specific crossing process can refer to other embodiments, which is not repeated here.

Continuing to refer to FIG. 9, the BU 108 comprises an optical switch 108a. The optical switch 108a is arranged on the first trunk fiber 106a. The first OXC equipment 104 is connected with the first trunk fiber 106a by the optical switch 108a. The optical switch 108a is configured for switching the first optical signal to the first OXC equipment 104 for transmission.

Continuing to refer to FIG. 9, the submarine optical cable system also comprises a repeater 110, wherein the repeater 110 is arranged on the trunk fiber set 106 between the first trunk station 101 and the BU 108. Alternatively, the repeater 110 can be arranged on the trunk fiber set 106 between the BU 108 and the second trunk station 102. Alternatively, the repeater 110 can be arranged between the branch station 103 and the OXC equipment. The repeater 110 can be used for amplifying the signal sent by the first trunk station 101, amplifying the signal sent by the second trunk station 102, and amplifying the signal uploaded by the branch station 103.

It should be noted that the opposite end equipment between the first trunk station 101 and the second trunk station 102 is not limited to the first terminal 101a, the second terminal 101b, the third terminal 102a and the fourth terminal 102b. The scheme comprising more terminals can refer to other embodiments, which is not repeated here.

The process of transferring the wavelength values by the OXC equipment, the process of transferring the spectral sub-bands by the OXC equipment, the process of dividing the spectral bandwidths, the process of transferring the cores by the OXC equipment and other processes can also refer to other embodiments, which are not repeated here.

If no special explanation is given, in the embodiments of the present application, the trunk fibers correspond to a trunk transmission channel set. The transmission channel can refer to one sub-band which is formed by one wavelength value or formed through combination of multiple wavelength values. For the multi-core fiber, the transmission channel can refer to one core.

It should be noted that the above embodiments are only used for explaining the technical schemes of the present application, but not the limit to the technical schemes of the present application. Although the present application is described in details with reference to the above embodiments, those ordinary skilled in the art should understand that the technical scheme recorded for each embodiment in the above can still be modified by those ordinary skilled in the art, or part of the technical characteristics therein are replaced equivalently; and these modifications or replacements do not make the essence of the corresponding technical schemes depart from the spirit and scope of the technical scheme of each embodiment of the present application.

What is claimed is:

1. A submarine optical cable system, comprising: a first trunk station, a second trunk station, a branch station, first optical cross-connect equipment, second optical cross-connect equipment, a branching unit, a trunk fiber set and a branch fiber, wherein
   one end of the first optical cross-connect equipment is connected with terminal equipment of the first trunk station by the trunk fiber set, the other end of the first optical cross-connect equipment is connected with one end of the second optical cross-connect equipment by the trunk fiber set, and the other end of the second optical cross-connect equipment is connected with terminal equipment of the second trunk station by the trunk fiber set;
   the trunk fiber set at least comprises a first trunk fiber and a second trunk fiber, and the first trunk fiber and the second trunk fiber are paths for transmitting optical signals;
   the first trunk station is configured for sending a first optical signal through the first trunk fiber, and the first trunk station is configured for sending a second optical signal through the second trunk fiber; the first optical signal and the second optical signal are service signals or dummy signals, wherein the service signals are signals that carry services, and the dummy signals are signals that do not carry services;
   the first optical cross-connect equipment is configured for crossing the first optical signal and the second optical signal, so as to obtain a crossed first optical signal and a crossed second optical signal; the second optical cross-connect equipment is configured for crossing the crossed first optical signal and the crossed second optical signal, so as to restore the crossed first optical signal to the first optical signal and restore the crossed second optical signal to the second optical signal;
   the second trunk station is configured for receiving the first optical signal through the first trunk fiber and receiving the second optical signal through the second trunk fiber; and
   the branching unit is arranged on the trunk fiber set between the first optical cross-connect equipment and the second optical cross-connect equipment, and comprises an optical switch, wherein
   the optical switch is arranged on the first trunk fiber such that the branch station is capable of downloading the crossed second optical signal from the first trunk fiber, or uploading an optical signal to the first trunk fiber, through the branch fiber, or
   the optical switch is arranged on the second trunk fiber such that the branch station is capable of downloading the crossed first optical signal from the second trunk fiber, or uploading an optical signal to the second trunk fiber, through the branch fiber.

2. The submarine optical cable system according to claim 1, wherein the first optical cross-connect equipment is configured for crossing the first optical signal and the second optical signal, so as to obtain the crossed first optical signal and the crossed second optical signal;
   wherein each of a spectral bandwidth of the first optical signal and a spectral bandwidth of the second optical signal comprises at least one wavelength value; and
   wherein the first optical cross-connect equipment is configured for crossing the wavelength value of the first optical signal and the wavelength value of the second optical signal, and the wavelength ranges of the wavelength values for crossing are same.

3. The submarine optical cable system according to claim 1, wherein the first optical cross-connect equipment is configured for crossing the first optical signal and the second optical signal, so as to obtain the crossed first optical signal and the crossed second optical signal;
   wherein each of a spectral bandwidth of the first optical signal and a spectral bandwidth of the second optical signal at least comprises one spectral sub-band, and each spectral sub-band comprises at least one or more wavelength values; and
   wherein the first optical cross-connect equipment is configured for crossing the spectral sub-band of the first optical signal and the spectral sub-band of the second optical signal, and the wavelength ranges of the spectral sub-bands for crossing are same.

4. The submarine optical cable system according to claim 1, wherein the first optical cross-connect equipment is configured for crossing the first optical signal and the second optical signal, so as to obtain the crossed first optical signal and the crossed second optical signal; and wherein the first trunk fiber and the second trunk fiber are two cores in a multi-core fiber, and the first optical signal and the second optical signal are signals transmitted in the cores; and the first optical cross-connect equipment and the second optical cross-connect equipment are also configured for crossing the optical signals between the cores.

5. The submarine optical cable system according to claim 1, wherein the terminal equipment of the first trunk station at least comprises a first terminal and a second terminal; the terminal equipment of the second trunk station at least comprises a third terminal and a fourth terminal; and the terminal equipment of the branch station at least comprises a fifth terminal;

the first terminal is configured for sending the first optical signal through the first trunk fiber;

the second terminal is configured for sending the second optical signal through the second trunk fiber;

the fifth terminal is configured for uploading an optical signal through the branch fiber or downloading the crossed first optical signal or the crossed second optical signal through the branch fiber;

the third terminal is configured for receiving the first optical signal through the first trunk fiber; and the fourth terminal is configured for receiving the second optical signal through second trunk fiber.

6. The submarine optical cable system according to claim 1, wherein the trunk fiber set also comprises a third trunk fiber, and the third trunk fiber is a path for transmitting an optical signal;

the first trunk station is also configured for sending a third optical signal through the third trunk fiber, and the third optical signal is a service signal or a dummy signal;

the first optical cross-connect equipment is also configured for crossing the first optical signal, the second optical signal and the third optical signal, so as to obtain a crossed first optical signal, a crossed second optical signal and a crossed third optical signal;

the second optical cross-connect equipment is configured for crossing the crossed first optical signal, the crossed second optical signal and the crossed third optical signal, so as to restore the crossed first optical signal to the first optical signal, restore the crossed second optical signal to the second optical signal and restore the crossed third optical signal to the third optical signal; and the second trunk station is configured for receiving the third optical signal through the third trunk fiber.

7. The submarine optical cable system according to claim 1, wherein the first trunk fiber is one path of fiber in a first trunk fiber pair, and the second trunk fiber is one path of fiber in a second trunk fiber pair.

8. The submarine optical cable system according to claim 1, wherein the submarine optical cable system also comprises reconfigurable optical add-drop multiplexer equipment, one end of the reconfigurable optical add-drop multiplexer equipment is connected with the branching unit through the branch fiber, and the other end of the reconfigurable optical add-drop multiplexer equipment is connected with the terminal equipment of the branch station through the branch fiber;

the reconfigurable optical add-drop multiplexer equipment is configured for downloading the crossed first optical signal or the crossed second optical signal to the branch station through the branch fiber; or the reconfigurable optical add-drop multiplexer equipment is configured for uploading the optical signal from the branch station through the branch fiber.

9. The submarine optical cable system according to claim 1, wherein the submarine optical cable system also comprises at least one repeater, the repeater is arranged on the trunk fiber set between the first optical cross-connect equipment and the second optical cross-connect equipment, or the repeater is arranged on the branch fiber;

the repeater is configured for amplifying the optical signal sent by the first trunk station; or the repeater is configured for amplifying the optical signal sent by the branch station.

10. The submarine optical cable system according to claim 1, wherein the fiber types of the trunk fibers and the branch fiber in the trunk fiber set comprise a single mode fiber, a multi-mode fiber or a multi-core fiber.

* * * * *